(12) United States Patent
Min et al.

(10) Patent No.: US 7,609,161 B2
(45) Date of Patent: Oct. 27, 2009

(54) RADIO FREQUENCY IDENTIFICATION DATA PROCESSING SYSTEM

(75) Inventors: Sang Cheol Min, Seoul (KR); Hee Seung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 222 days.

(21) Appl. No.: 11/437,030

(22) Filed: May 19, 2006

(65) Prior Publication Data

US 2007/0120647 A1    May 31, 2007

Related U.S. Application Data

(60) Provisional application No. 60/683,255, filed on May 20, 2005.

(51) Int. Cl.
*G08B 13/14* (2006.01)
(52) U.S. Cl. .............. 340/572.1; 340/10.1; 340/539.27; 235/380
(58) Field of Classification Search .............. 340/572.1, 340/10.1, 539.27, 870.17, 5.9; 235/383, 235/380, 385; 455/41.2
See application file for complete search history.

(56) References Cited

U.S. PATENT DOCUMENTS 7,219,834 B2 *   5/2007   Chang ........................ 235/380
2003/0210154 A1 * 11/2003 Bredow et al. ......... 340/825.25
2004/0010562 A1 *  1/2004 Itonaga ....................... 709/213
2004/0080429 A1 *  4/2004 Wolfe .................... 340/870.07
2004/0087273 A1 *  5/2004 Perttila et al. .............. 455/41.2
2004/0145472 A1 *  7/2004 Schmidtberg et al. .. 340/539.27
2004/0164148 A1 *  8/2004 Qiu ............................ 235/383
2005/0086108 A1 *  4/2005 Sakamoto et al. ............. 705/14
2006/0091207 A1 *  5/2006 Chang ........................ 235/385
2006/0208888 A1 *  9/2006 Patel et al. ................ 340/572.1
2006/0220838 A1 * 10/2006 Wakim et al. .......... 340/539.12

* cited by examiner

*Primary Examiner*—Davetta W Goins
*Assistant Examiner*—Hoi C Lau
(74) *Attorney, Agent, or Firm*—Lee, Hong, Degerman, Kang & Waimey

(57) ABSTRACT

An RFID tag data processing system is provided. RFID tag data read by an RFID reader are filtered by a filter module mounted on a mobile terminal according to filtering configuration. According to the results of the filtering operation, an address value of a content server is obtained from a connection data server. The address obtained from the connection data server is used to access the corresponding content server, thereby enabling a user to access necessary contents.

14 Claims, 4 Drawing Sheets

RADIO FREQUENCY IDENTIFICATION DATA PROCESSING SYSTEM

CROSS-REFERENCE TO RELATED APPLICATIONS

Pursuant to 35 U.S.C. § 119(a), this application claims the benefit of U.S. Provisional Application Ser. No. 60/683,255 filed on May 20, 2005, the contents of which is hereby incorporated by reference herein in its entirety.

BACKGROUND OF THE INVENTION

Field of the Invention

The present invention relates to a system for recognizing and processing radio frequency identification (RFID) data.

The ISO and EPC standards define a reader protocol that supports connection of an RFID reader to a host through a network. In RFID systems, an RFID reader is mounted on a mobile phone or attached to the mobile phone in a dongle configuration. An RFID reader control unit of the mobile phone controls the RFID reader to write/read data to/from a tag.

In mobile phone environments, an RFID system is employed between a processor (e.g., MPU and MCU) of a mobile phone and an RFID reader chip installed in the mobile phone. Alternatively, a reader protocol is employed between a mobile phone and an RFID reader attached onto the mobile phone in a dongle configuration. When an RFID reader is attached onto a mobile phone in a dongle configuration, the RFID reader and the mobile phone are connected by an interface unit such as UART or USB.

SUMMARY OF THE INVENTION

Accordingly, the present invention is directed to an RFID data processing system that substantially obviates one or more problems due to limitations and disadvantages of the related art.

An object of the present invention is to provide an RFID tag data processing method and an RFID data processing system.

Another object of the present invention is to provide an RFID data processing system that makes it possible to filter, at a mobile terminal, tag data read by an RFID reader and transmit the resulting data to an upper layer application.

A further another object of the present invention is to provide an RFID data processing system that makes it possible to filter, at a mobile terminal, tag data read by an RFID reader and transmit the resulting data to an upper layer application, wherein filter data can be configured by a user.

A still further another object of the present invention is to provide a mobile terminal with an RFID filtering module, which makes it possible to display, on its display unit, only a desired one of various tags read by an RFID reader of the mobile terminal.

An even further another object of the present invention is to provide an RFID data processing system, which makes it possible to obtain, from a connection data server, connection data for receiving contents according to the results of a filtering operation on tag data read by an RFID reader of a mobile terminal, by mounting an RFID filtering module on an RFID mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an RFID data processing method including: recognizing tag data at a mobile terminal; filtering the recognized tag data; and transferring the filtered tag data to an upper layer application.

In another aspect of the present invention, there is provided an RFID data processing method including: recognizing tag data at a mobile terminal; filtering the recognized tag data and connecting to a first server according to the results of the filtering operation to obtain connection data; and connecting to a second server according to the obtained connection data to access corresponding contents.

In the method, the filter data may be configured in advance by a user.

In the method, the connection data may be position data for connection to a corresponding system.

In the method, the connection data may be URL-based server position data.

In the method, the connection data may be address data for receiving contents using an object ID or an EPC code in an RFID tag.

In the method, the first server may be an object directory server.

In the method, the first server may be an object directory server in which addresses of content servers corresponding to respective object ID are mapped. Alternatively, the first server may be an object directory server in which addresses of content servers corresponding to respective EPC codes are mapped.

In the method, the second server may be a content server.

In a further another aspect of the present invention, there is provided a mobile terminal including: an RFID reader for recognizing RFID tag data; and a filtering module for filtering the recognized RFID tag data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

An RFID data processing system according to the present invention includes: an RFID reader configured to read data written into a tag; and a tag data processor configured to recognize and process the data read by the RFID reader. The tag data processor may be, for example, a mobile terminal. The mobile terminal may be, for example, a mobile phone. The RFID reader may be installed in the mobile terminal. Alternatively, the RFID reader may be connected through an interface unit to the mobile terminal in a dongle configuration.

In the following embodiments of the present invention, a mobile terminal (e.g., a mobile phone) with an RFID reader is taken as an example of a terminal with an RFID reader control unit.

Figure 1:
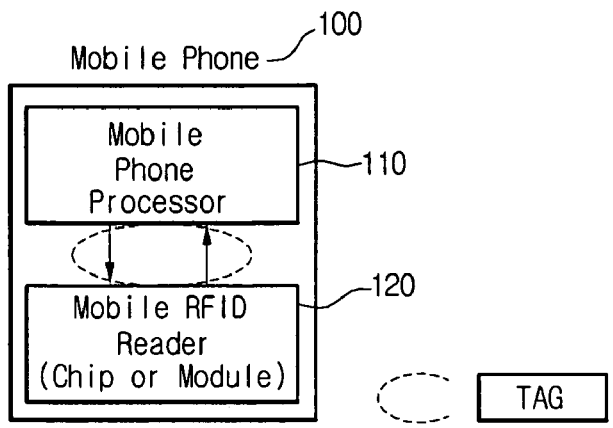
FIGS. 1 and 2 illustrate the configurations of mobile RFID systems according to embodiments of the present invention.
Figure 2:
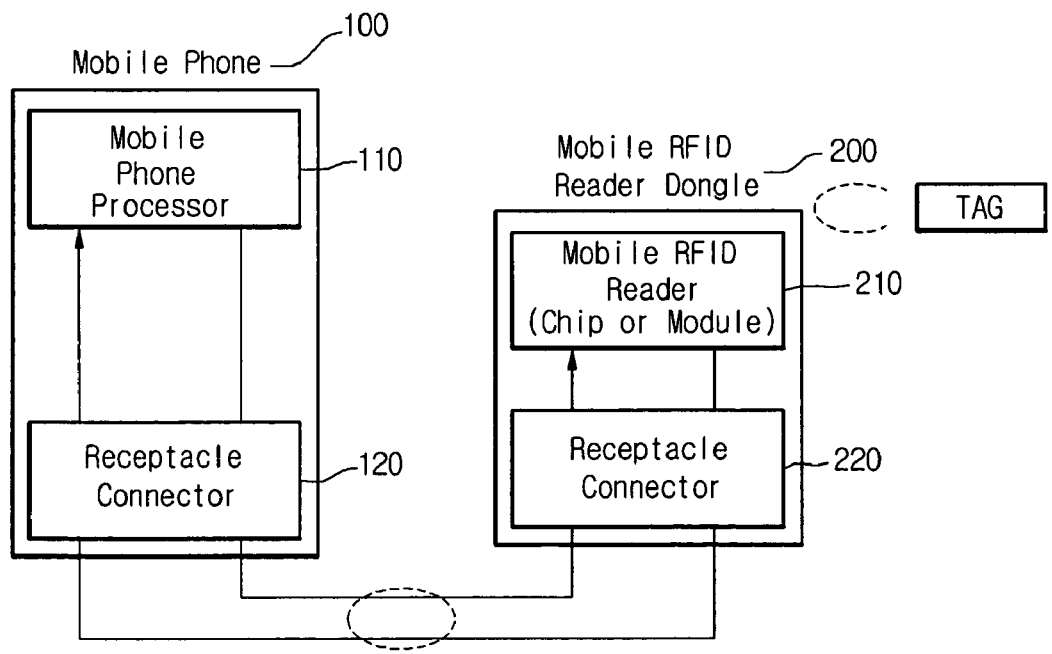

FIG. 1 illustrates a mobile RFID system configuration when a mobile RFID reader is installed in a mobile phone (which here is a mobile phone). FIG. 2 illustrates a mobile RFID system configuration when a mobile RFID reader is attached to the outside of a mobile phone (which here is a mobile phone) in a dongle configuration.

Referring to FIG. 1, a mobile phone 100 includes a mobile phone processor 110 and a chip-type or module-type mobile RFID reader 120. The mobile phone processor 110 controls the mobile RFID reader 120. Under the control of the mobile phone processor 110, the mobile RFID reader 120 writes/reads data to/from a tag. The tag data read by the mobile RFID reader 120 are transferred to the mobile phone processor 110. The mobile phone processor 110 decodes and recognizes the tag data. The mobile phone processor 110 stores the recognized tag data or provides the recognized tag data to a user using a display device.

Referring to FIG. 2, a mobile phone 100 includes a mobile phone processor 110 and a receptacle connector 120. A mobile RFID reader 210 is attached to the outside of the mobile phone 100 in a dongle configuration. The mobile RFID reader 210 is connected to the mobile phone 100 by receptacle connectors 120 and 220. The mobile phone processor 110 controls the mobile RFID reader 120 through the receptacle connectors 120 and 220. Under the control of the mobile phone processor 110, the mobile RFID reader 120 writes/reads data to/from a tag. The tag data read by the mobile RFID reader 120 are transferred to the mobile phone processor 110 through the receptacle connectors 120 and 220. The mobile phone processor 110 decodes and recognizes the tag data. The mobile phone processor 110 stores the recognized tag data or provides the recognized tag data to a user using a display device.

Figure 3:
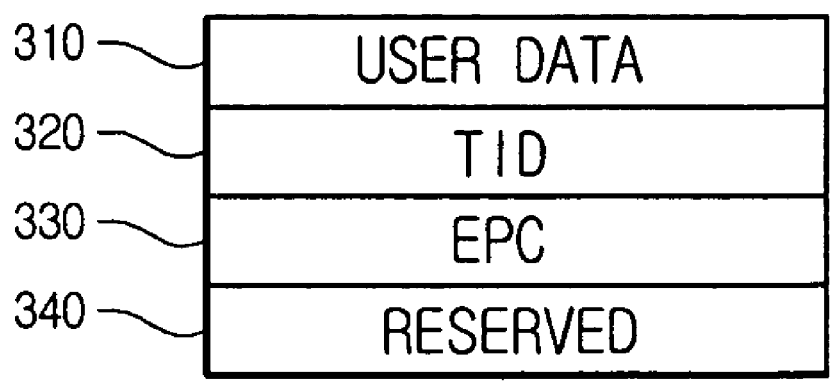
FIGS. 3 and 4 illustrate examples of the structure of tag data according to embodiments of the present invention.
Figure 4:
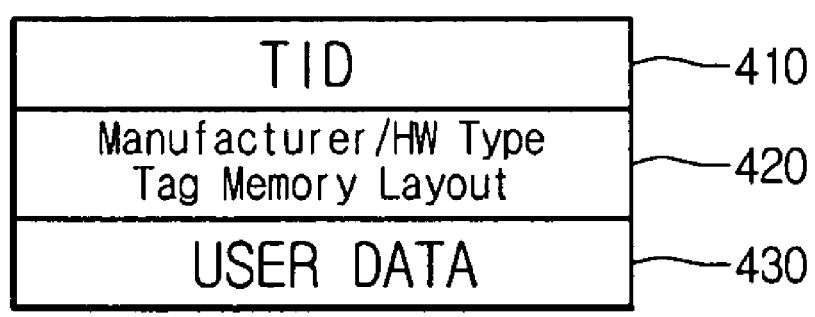

FIGS. 3 and 4 illustrate examples of the structure of tag data according to embodiments of the present invention. FIG. 3 illustrates an example of an EPC tag, and FIG. 4 illustrates an example of an ISO tag.

Referring to FIG. 3, a tag according to an embodiment of the present invention includes a user data area 310, a TID 320, an EPC 330, and a reserved area 310. The user data area 310 is assigned as an area to/from which users can freely store data. Tag data are written into the TID 320, and an EPC code is written into the EPC 330.

Referring to FIG. 4, a tag according to another embodiment of the present invention includes a TID 410, a data area 420, and a user data area 430. The data area 420 is used to store data about manufacturers, hardware types, and tag memory layouts. The user data area 430 is assigned as an area to/from which users can freely store data.

These tag data are read by the RFID reader. The read tag data are filtered by a filtering module of the mobile terminal, and the resulting data are transferred to the upper layer application. The filter may be configured by the user, and a filtering level may be adjusted. Also, an address for receiving, at the mobile terminal, contents desired by the user is obtained using the object ID or the EPC code in the RFID tag, according to the results of the tag data filtering operation of the filtering module.

That is, according to the present invention, the mobile terminal has an RFID reader. The mobile terminal is mounted with a filtering module that can filter tag data read by the RFID reader during a period while the read tag data are being transferred to the upper layer application. Connection to an object directory server (ODS) is performed to receive an address that is used to receive contents corresponding to a code value of a tag according to the filtering results. The mobile terminal itself performs an ODS resolving process for receiving a desired address from the ODS. It can be understood that the ODS corresponds to an object name server (ONS) located on an EPC global RFID system. In this way, an ODS resolving module serving as the ONS provided in the EPC global RFID system is mounted on the mobile terminal, thereby making it possible to provide a mobile RFID related service.

Each object ID or EPC code and a content server address corresponding to each code are mapped in the ODS. The mobile terminal reads tag data and determines, according to the results of data filtering, whether the data must pass through the ODS. When the data must pass through the ODS, communication with the ODS is performed to receive and obtain data of the content server. On the basis of the obtained connection data, the mobile terminal is connected to the corresponding content server. The connection to the serer may be performed through a wired or wireless network.

Figure 5:
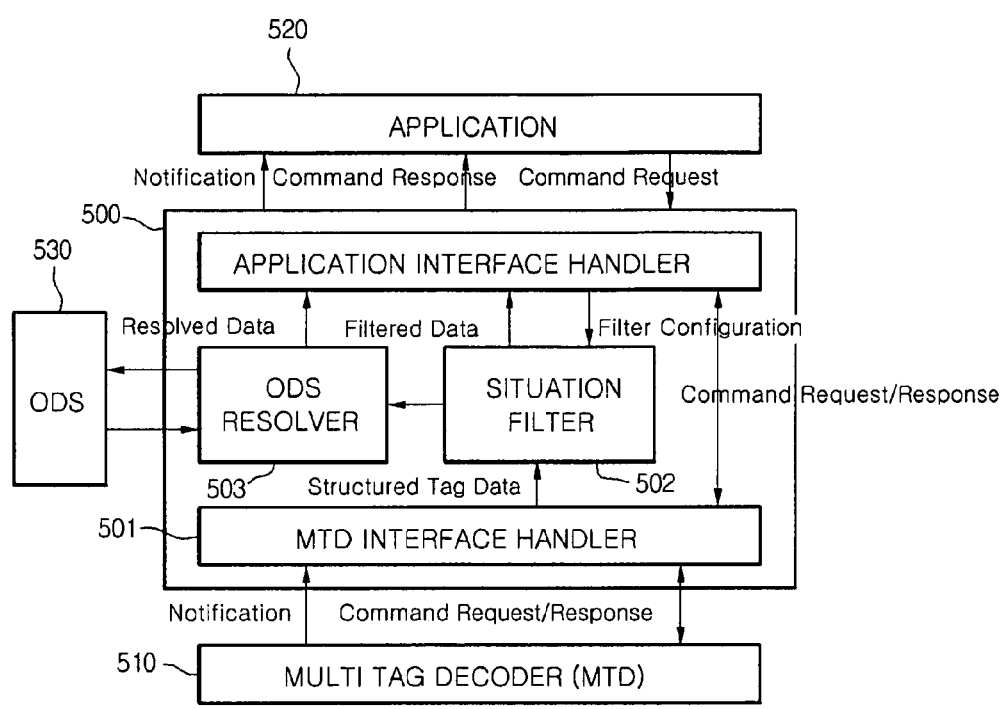
FIG. 5 illustrates the structure of a data processing system according to an embodiment of the present invention.

FIG. 5 illustrates the structure of an RFID data processing system according to an embodiment of the present invention. The RFID data processing system includes a filtering middleware architecture in the mobile RFID reader.

Referring to FIG. 5, an RFID data processing system includes, a middleware unit 500, a tag decode unit 510, an application unit 520, and an ODS 530. The middleware unit 500 includes an multi-tag decoder (MTD) interface handler 501, a situation filter 502, an ODS resolver 503, and an application interface handler 504.

The MTD 510 converts a variety of tag formats read from the tag into a general format and transfers the resulting data to the middleware unit 500. The data transferred from the MTD 510 to the middleware unit 500 includes Notification. Data exchanged between the middleware unit 500 and the MTD 510 includes a command request and a response.

The contents of a protocol performed between the RFID reader and the processor of the mobile terminal can be classified into three types, which are a command, a response, and a notification that is defined in the ISO and EPC standards. The command and the response exist and operate in pair. Only after a response corresponding to a command is received, the next command is executed. Each command and response has a peculiar code. Commands and responses in a mobile RFID reader protocol are categorized into reader control/management, tag-read, tag write, tag lock/unlock, tag kill, and additional functions.

A notification is a protocol message that is transmitted from the RFID reader to the processor of the terminal. Unlike a response message, the notification protocol message is independent of a command. The notification can be for critical errors generated in the RFID reader. When a critical error is generated in the reader, the notification is used to inform the processor of the error. The critical errors are not defined in the present invention, but may be those defined by a vendor.

The MTD interface handler 501 takes charge of an interface with the MTD 510. The MTD interface handler 501 receives structured tag data from the MTD 510, and transmits the tag data to the situation filter 502. Also, the MTD interface handler 501 transfers a command, which is received through the application interface handler 504, to the MTD 510. Also, the MTD 510 transfers a response from the decoder 510 to the upper layer application unit 520.

The middleware unit 500 receives and processes structured tag data that is received from the MTD 510 through the MTD interface handler 501. At this point, the situation filter 502 determines, according to the results of data filtering, whether the structured tag data must pass through the ODS 530. When the structured tag data must pass through the ODS 530, corresponding data is transferred to the ODS resolver 503. On the other hand, when the structured tag data need not pass through the ODS 530, a filtering operation is performed according to a filtering configuration set by the user, to transfer the processed data to the upper layer application 520 through the application interface handler 504. The application 520 displays the corresponding data on the display unit of the mobile terminal.

According to the connection data, the mobile terminal may access the corresponding content server through a wired or wireless communication network. Data for the connection to the server is the server position on the network. The position data may be a URL or an IP address of the server.

When the connection to the server is successful, data provided from the server are received at the mobile terminal. The received data are processed by the general data communication technology such as a decoding scheme, and the resulting data are stored in the mobile terminal or displayed on the display unit of the mobile terminal.

In response to the connection data from the situation filter 502, the ODS resolver 503 connects to and communicates with the ODS 530 to receive the connection data of the content server. The resolved data are transferred through the application interface handler 504 to the upper layer application 520. At this point, each object ID or EPC code and a content server address corresponding to each code are mapped in the ODS 530. Therefore, the connection data that the ODS resolver 503 obtain from the ODS 530 becomes the content server address. Accordingly, upon reception of these connection data, the upper layer application 520 connects to the content server using the corresponding connection data, which enables the user to access necessary contents. For example, using the content server address, the upper layer application 520 can receive contents, which is desired by the user, from a mobile service provider server through a WAP (wireless application protocol) browser.

Using the communication unit, the mobile terminal connects to a server indicated by the connection data through a wired or wireless network. The connection to the server makes it possible to obtain necessary contents from the server.

An example of the above connection data is the position data of the server. Examples of the server position data are a URL and an IP address. In most cases, an OID (object ID) or a TID (tag ID) is read from the RFID tag, and the position of a server storing necessary data is identified by a connection data server to receive the necessary data.

Figure 6:
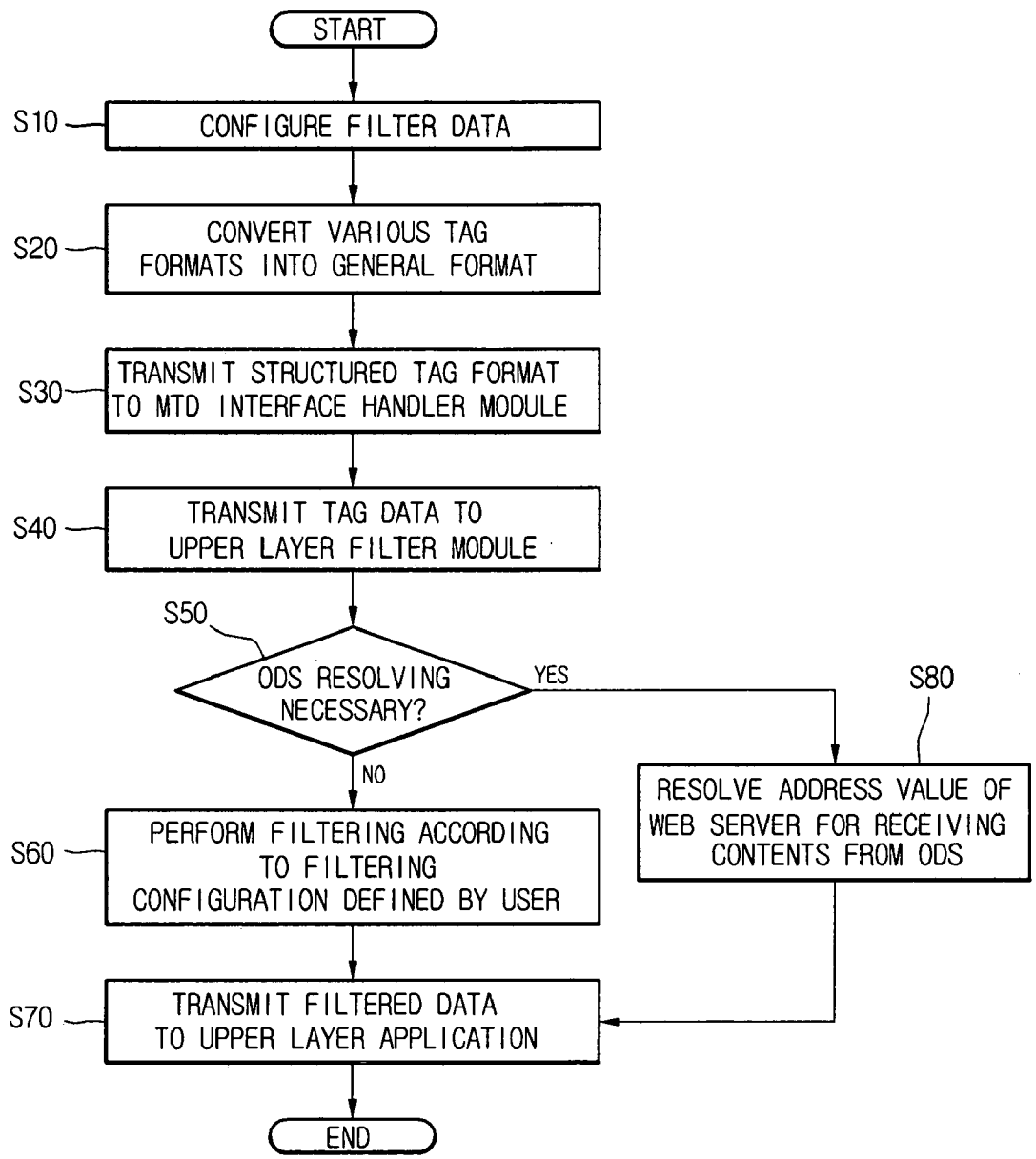
FIG. 6 is a flowchart illustrating a data processing method according to an embodiment of the present invention.

FIG. 6 is a flowchart illustrating an RFID data processing method according to an embodiment of the present invention.

According to the RFID data processing method illustrated in FIG. 6, the RFID reader reads the value of tag to perform a filtering operation, connects to the ODS to receive an address that is used to receive contents according to the filtering results, and receives a desired address from the ODS to connect to the corresponding content server.

The MTD 510 converts a variety of tag formats into a general format and transfers the resulting data to the middleware unit 500. The middleware unit 500 receives the resulting data and transfers the received data to the situation filter 502. The situation filter 502 determines whether corresponding data must pass through the ODS 530. When the corresponding data must pass through the ODS 530, the corresponding data is transferred to the ODS resolver 503. On the other hand, when the corresponding data need not pass through the ODS 530, a filtering operation is performed according to a filtering configuration set by the user, to transfer the processed data to the upper layer application 520. The upper layer application 520 displays data on the display unit of the mobile terminal using the corresponding data. Data resolved the ODS resolver 503 are transferred to the upper layer application 520. Using the corresponding data, the upper layer application 520 receives contents, which is desired by the user, from a mobile service provider server through a WAP browser.

These operations will now be described in detail with reference to FIG. 6.

Referring to FIG. 6, in operation S10, a user configures filter data. The configuring of the filter may be performed using a display unit and a key interface of the mobile terminal. A variety of filter configuration items (Refer to a filtering/collection scheme and an RFID architecture of an EPC global structure in the conventional RFID system) are displayed on the display unit of the mobile terminal. When the user selects and configures necessary items (such as a filtering level) among the displayed filter configuration items using the key interface unit, the corresponding configuration data is stored. The stored filter configuration data are used during the tag filtering operation of the filtering module-the situation filter.

In operation S20, the RFID reader reads data of a tag and the MTD (multi-tag decoder) converts various tag formats into a general format.

In operation S30, tag format data structured by the MTD (structured tag data) are transmitted to the MTD interface handler module.

In operation S40, the MTD interface handler module transmits the structured tag data to the upper layer filter module.

In operation S50, it is determined whether an ODS resolving operation is necessary. That is, according to the results of a tag data filtering operation of the filter module, it is determined whether the corresponding data need pass through the ODS. When the ODS resolving process is not necessary, the RFID data processing method proceeds to operation S60. On the other hand, when the ODS resolving process is necessary, the method proceeds to operation S80.

In operation S60, when the ODS resolving process is not necessary, the middleware unit processes necessary data. That is, a filtering operation is performed according to the filtering configuration defined by the user.

In operation S70, the data processed in operation S60 or S80 are transmitted to the upper layer application. When the corresponding data read and decoded need not pass through the ODS, the data processed in operation S60 are transmitted to the upper layer application and the upper layer application displays the corresponding data on the display unit of the mobile terminal. On the other hand, when the corresponding data need pass through the ODS, the data processed in operation S80 are transmitted to the upper layer application.

In operation S80, the ODS resolver resolves an address value of a Web server for receiving contents from the ODS. The resolved address value of the Web server is transmitted to the upper layer application through operation S70. In this case, using the content server connection data (i.e., the Web server address value), the upper layer application connects to a mobile service provider server through a WAP browser, thereby making it possible to access and receive contents desired by the user from the server.

On the basis of the connection data, the mobile terminal may connect to the corresponding contents server through a wired or wireless communication network. The data for the connection to the server may be the server position on the network. The position data may be, for example, a URL or an IP address of the server.

When the connection to the server is successful, data provided from the server are received at the mobile terminal. The received data are processed by the general data communication technology such as a decoding scheme, and the resulting data are stored in the mobile terminal or displayed on the display unit of the mobile terminal.

The tag data read by the RFID reader are filtered according to the filtering configuration of the filter module of the mobile terminal, which is defined by the user. Connection to the ODS is performed using a code value of the RFID tag according to the results of the filtering operation. The content server address corresponding to the code is received at the mobile terminal. The mobile terminal connects to the corresponding server using the received content server address. Accordingly, necessary data or services can be directly accessed from the server.

As described above, in the RFID system, the data read from the tag by the RFID reader are filtered by the filter module of the mobile terminal. The server connection data are obtained according to the results of the filtering operation. Connection to the corresponding server is performed on the basis of the obtained server connection data, thereby making it possible to directly access the necessary data. Accordingly, it is possible to provide RFID system environments that make it possible to receive more abundant and various services and data from a related server on the basis of the tag.

The present invention can be applied to an RFID system. It is possible to additionally obtain more abundant and various data through the related server using the data read from the tag. Also, it is possible to directly access the desired server by the RFID tag data, using the mobile terminal and the RFID reader, which is installed in the mobile terminal or attached to the mobile terminal in a dongle configuration.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A data processing method comprising:
   recognizing tag data by way of reading the tag data using an RFID reader embedded in a mobile communication terminal;
   determining whether the recognized tag data requires additional information about an object associated with the tag data;
   filtering the recognized tag data determined as requiring additional information using a filtering module embedded in the mobile communication terminal, wherein the filtering module makes a determination whether the recognized tag data is to be forwarded to a remote object directory server (ODS) to obtain the additional information about the object associated with the tag data; and
   transferring the filtered tag data to the remote ODS, in response to a first result obtained from the filtering.

2. The data processing method according to claim 1, wherein the filtering module is configured in advance by a user to determine types of tag data that are to be transferred to the remote ODS.

3. A data processing method comprising:
   recognizing tag data by way of reading the tag data using an RFID reader embedded in a mobile communication terminal;
   determining whether the recognized tag data requires additional information about an object associated with the tag data;
   filtering the recognized tag data determined as requiring additional information using a filtering module embedded in the mobile communication terminal, wherein the filtering module makes a determination whether the recognized tag data is to be forwarded to a first server;
   connecting the mobile communication terminal to the first server over a cellular network according to the results of the filtering to obtain connection data to a second server; and
   connecting to the second server according to the obtained connection data to access the additional information.

4. The data processing method according to claim 3, wherein the connection data comprises URL-based server position data.

5. The data processing method according to claim 3, wherein the connection data comprises address data for receiving contents using an object ID or an EPC code in an RFID tag.

6. The data processing method according to claim 3, wherein the first server is an object directory server.

7. The data processing method according to claim 5, wherein the first server is an object directory server in which addresses of content servers corresponding to respective object ID are mapped.

8. The data processing method according to claim 5, wherein the first server is an object directory server in which addresses of content servers corresponding to respective EPC codes are mapped.

9. The data processing method according to claim 3, wherein the second server is a content server.

10. A mobile communication terminal comprising:
    an RFID reader for recognizing tag data; and
    a filtering module for filtering the recognized tag data,
    wherein the filtering module makes a determination whether the recognized tag data is to be forwarded to a remote object directory server (ODS), and sets criteria for filtering as the recognized tag data requires additional information about an object associated with the tag data, and
    wherein the recognized tag data is transferred to the remote ODS, in response to a first result obtained from the filtering.

11. The mobile communication terminal according to claim 10, wherein the filter is configured in advance by a user to determine types of tag data that are to be transferred to the remote ODS.

12. A mobile terminal comprising:

an RFID reader for recognizing tag data;

a filtering module for filtering the recognized tag data; and a connection data server module for connecting to a first server according to the results of the filtering operation to obtain connection data associated with a second server, wherein the filtering module makes a determination whether the recognized tag data is to be forwarded to the first server, and sets criteria for filtering when the recognized tag data indicates that additional information about an object associated with the tag data is needed, and wherein the recognized tag data is transferred to the first server, in response to a first result obtained from the filtering.

13. The mobile terminal according to claim 12, wherein the connection data comprises address data for receiving contents using an object ID or an EPC code in an RFID tag.

14. The mobile terminal according to claim 13, wherein the first server is an object directory server in which addresses of content servers corresponding to respective object ID are mapped.

\* \* \* \* \*